US008033808B2

(12) United States Patent
Sevigny

(10) Patent No.: US 8,033,808 B2
(45) Date of Patent: Oct. 11, 2011

(54) PRESSURE COMPENSATING MOLDING SYSTEM

(75) Inventor: Robert Sevigny, Athens, TN (US)

(73) Assignee: Delta PT, LLC, Athens, TN (US)

(*) Notice: Subject to any disclaimer, the term of this patent is extended or adjusted under 35 U.S.C. 154(b) by 440 days.

(21) Appl. No.: 12/194,897

(22) Filed: Aug. 20, 2008

(65) Prior Publication Data
US 2009/0053350 A1 Feb. 26, 2009

Related U.S. Application Data

(60) Provisional application No. 60/957,834, filed on Aug. 24, 2007.

(51) Int. Cl.
*B29C 45/76* (2006.01)

(52) U.S. Cl. ...... 425/149; 264/40.3; 425/390; 425/405.2

(58) Field of Classification Search .................. 425/149, 425/389, 390, 405.1, 405.2; 264/40.3, 40.5, 264/406
See application file for complete search history.

(56) References Cited

U.S. PATENT DOCUMENTS

| | | | |
|---|---|---|---|
| 3,129,270 A | 4/1964 | Hood | |
| 3,614,811 A * | 10/1971 | Johnon | 425/389 |
| 3,664,799 A * | 5/1972 | Wallick | 425/405.2 |
| 3,671,168 A * | 6/1972 | Nussbaum | 425/547 |
| 3,680,629 A | 8/1972 | Gaudreau et al. | |
| 3,705,248 A * | 12/1972 | Hill | 264/294 |
| 3,733,161 A * | 5/1973 | Nussbaum | 249/80 |
| 3,768,948 A * | 10/1973 | Horberg et al. | 425/526 |
| 3,784,344 A * | 1/1974 | Korsch | 425/526 |
| 4,233,261 A * | 11/1980 | Mijnheer | 264/293 |
| 4,390,485 A | 6/1983 | Yang | |
| 4,548,773 A * | 10/1985 | Suh et al. | 264/40.6 |
| 4,731,961 A | 3/1988 | Bona | |
| 4,780,256 A | 10/1988 | Sasaki et al. | |
| 4,798,527 A | 1/1989 | Gunda | |
| 4,851,167 A * | 7/1989 | Marc | 264/421 |
| 4,878,826 A * | 11/1989 | Wendt | 425/384 |
| 4,946,640 A * | 8/1990 | Nathoo | 264/316 |
| 4,957,585 A * | 9/1990 | Semff | 156/382 |
| 5,186,954 A | 2/1993 | Miyahara et al. | |
| 5,190,715 A * | 3/1993 | Yamada et al. | 264/526 |
| 5,376,317 A | 12/1994 | Maus et al. | |
| 5,378,134 A * | 1/1995 | Blot et al. | 425/149 |

(Continued)

OTHER PUBLICATIONS

International Search Report (ISR) and Written Opinion (WO) for International Application No. PCT/US2008/74132, mailed date Nov. 13, 2008.

*Primary Examiner* — Yogendra Gupta
*Assistant Examiner* — Emmanuel S Luk
(74) *Attorney, Agent, or Firm* — Knox Patents; Thomas A. Kulaga

(57) ABSTRACT

A pressure compensating molding system with die faces of thin sheets. A thin die sheet separates a mold cavity from a heating/cooling cavity. A heating system causes a heated fluid to flow through the heating/cooling cavity, thereby preheating the thin sheet. The injection material is forced through a sprue into the mold cavity. Pressure sensors monitor the pressure of the injection material in the mold cavity and in the heating/cooling cavity. A controller varies the pressure in the heating/cooling cavity to equalize a pressure differential across the thin die sheet. A cooling system causes a cooling fluid to flow through the heating/cooling cavity to cool the molded component.

18 Claims, 6 Drawing Sheets

U.S. PATENT DOCUMENTS

| | | | | |
|---|---|---|---|---|
| 5,423,670 A * | 6/1995 | Hamel | | 425/144 |
| 5,427,518 A * | 6/1995 | Morizot et al. | | 425/504 |
| 5,427,599 A * | 6/1995 | Greschner et al. | | 65/305 |
| 5,545,026 A * | 8/1996 | Fritz et al. | | 425/389 |
| 5,653,907 A | 8/1997 | Kendall et al. | | |
| 5,762,972 A | 6/1998 | Byon | | |
| 5,787,974 A | 8/1998 | Pennington | | |
| 5,820,894 A * | 10/1998 | Kreutzer | | 425/389 |
| 5,824,237 A | 10/1998 | Stumpf et al. | | |
| 5,857,358 A * | 1/1999 | De Vries et al. | | 65/106 |
| 5,869,108 A | 2/1999 | Hiraoka | | |
| 5,938,810 A * | 8/1999 | De Vries et al. | | 65/268 |
| 5,993,721 A * | 11/1999 | Kurihara et al. | | 264/402 |
| 6,030,576 A * | 2/2000 | Cassani | | 264/570 |
| 6,048,189 A * | 4/2000 | Kurihara et al. | | 425/149 |
| 6,099,285 A * | 8/2000 | Kurihara et al. | | 425/144 |
| 6,149,844 A * | 11/2000 | Graham | | 264/71 |
| 6,290,882 B1 | 9/2001 | Maus et al. | | |
| 6,305,925 B1 * | 10/2001 | Cassani | | 425/405.1 |
| 6,312,628 B1 | 11/2001 | Wieder et al. | | |
| 6,321,570 B1 * | 11/2001 | De Vries et al. | | 65/104 |
| 6,623,672 B2 * | 9/2003 | McCollum et al. | | 264/40.1 |
| 6,695,607 B2 | 2/2004 | Chiu et al. | | |
| 6,790,388 B2 | 9/2004 | Chiu et al. | | |
| 6,846,445 B2 | 1/2005 | Kim et al. | | |
| 6,854,967 B2 | 2/2005 | Tsutsui et al. | | |
| 7,081,219 B2 * | 7/2006 | Stewart | | 264/40.5 |
| 7,195,734 B2 * | 3/2007 | Heidari | | 264/667 |
| 7,553,435 B2 * | 6/2009 | McCollum | | 264/40.5 |
| 7,691,313 B2 * | 4/2010 | Choi et al. | | 264/299 |
| 2003/0059490 A1 * | 3/2003 | Moore, Jr. | | 425/2 |
| 2004/0032063 A1 * | 2/2004 | Walther | | 264/544 |
| 2005/0184416 A1 * | 8/2005 | McCollum | | 264/40.5 |
| 2006/0263469 A1 | 11/2006 | Feick | | |
| 2007/0035070 A1 * | 2/2007 | Jiang et al. | | 264/500 |
| 2007/0068190 A1 | 3/2007 | Venkatakrishnan et al. | | |
| 2007/0108668 A1 | 5/2007 | Hutchinson | | |
| 2009/0295015 A1 * | 12/2009 | Kuntz et al. | | 264/135 |

* cited by examiner

PRESSURE COMPENSATING MOLDING SYSTEM

CROSS-REFERENCE TO RELATED APPLICATIONS

This application claims the benefit of U.S. Provisional Application No. 60/957,834, filed Aug. 24, 2007.

STATEMENT REGARDING FEDERALLY SPONSORED RESEARCH OR DEVELOPMENT

Not Applicable

BACKGROUND OF THE INVENTION

1. Field of Invention

This invention pertains to a molding system. More particularly, this invention pertains to a molding system in which the die faces are formed of thin sheets that are heated and cooled on demand by a fluid outside the mold cavity. Further, the dimensional stability of the thin sheets is maintained by equalizing the pressure between the mold cavity and the fluid cavities on the opposite side of each thin sheet.

2. Description of the Related Art

A common manufacturing method is molding in which a material is placed in a cavity and the material is set or cured to conform to the shape of the cavity. For example, one type of molding process is injection molding, which involves injecting a molten material into a cavity under high pressure. The pressure forces the molten material to flow throughout the cavity. As the molten material cools, it hardens. Temperature control of the injection mold allows the molten material to flow throughout the cavity and to also aid in the setting or curing of the material. The molten material must be maintained above its melting temperature while being injected and filling the cavity. Then the heat from the molten material must be removed to set or cure the material into a molded product.

Typically, a mold is at a lower temperature than the melting temperature of the molten material. As the molten material is injected it cools as heat is transferred to the mold. The injection pressure is maintained at a level sufficient to force the molten material into the cavity. As the molten material begins to cool as it flows, a high injection pressure is required to maintain the flow of the material into the cavity. The high injection pressure requires that the mold be massive and have sufficient structural strength to prevent the mold cavity from deforming when subjected to high injection pressures.

Because molds are massive to withstand the high injection pressures, the molds have high thermal mass. Generally, it is desirable to maintain the temperature of the mold within certain limits to minimize shrinkage and distortion of the material as it sets or cures. Temperature control also ensures uniformity among replicated molded objects. As the mold is used repeatedly, excess heat must be removed quickly to minimize downtime between injecting the molten material for another object. But, the high thermal mass results in difficulties in controlling the mold temperature.

Many ingenious attempts have been made to control the temperature of conventional, massive molds. For example, U.S. Pat. No. 5,762,972 discloses an injection molding system that uses induction heating to quickly heat the mold. U.S. Pat. No. 6,846,445 discloses a mold that uses surface heating generated by surface current due to proximity effect and/or skin effect on the mold insert powered by radio-frequency or high-frequency electrical current. U.S. Pat. No. 6,312,628 discloses a mold that uses low pressure water to cool the mold. The patented apparatus uses water phase change, from liquid to steam, to increase the heat transfer from the mold.

Temperature control is desirable for other molding processes, not just injection molding. For example, resin transfer molding uses a molding material that is exothermic, that is, it gives off heat as the material cures. This excess heat must be removed to avoid undesirable artifacts in the molded object. It is also desirable for the mold to be at an elevated temperature to aid the filling of the mold. For example, U.S. Pat. No. 5,653,907 discloses a shell mold with a hollow support structure with a plurality of intersecting upstanding support ribs supporting a substrate layer that supports a thin, hard, thermally responsive mold shell. The substrate acts as a heat sink to dissipate heat from the shell.

BRIEF SUMMARY OF THE INVENTION

Minimizing the thermal mass of the mold aids in reducing the injection pressure by reducing the thermal lag for heating and/or cooling a mold to accommodate the temperature requirements for the molding material, thereby producing high quality molded objects quickly and repeatably. The present invention minimizes the thermal mass by separating the molding cavity from a heating/cooling fluid cavity with a thin member having good heat transfer properties. In one such embodiment, the fluid cavity is insulated from a platen. Deformation of the thin member by the pressure of the molding material entering the mold cavity is prevented/controlled by pressurizing the fluid in the fluid cavity to match the pressure of the molding material in the mold cavity.

In various embodiments, obstructions positioned inside the fluid cavity disrupt the flow of the fluid in the fluid cavity, thereby causing turbulent flow conditions and ensuring uniform fluid, and thermal, distribution in the fluid cavity. Stanchions positioned in the fluid cavity and extending to the thin member serve to maintain stability of the mold cavity by preventing deformation of the thin member defining the mold cavity. In one such embodiment, the stanchions have a through-opening that allows passage of an ejector or a slide into the mold cavity. The hollow stanchions form a seal between the mold cavity and the fluid cavity around the opening for the ejector or slide.

In one embodiment, an insulator is positioned on the fluid cavity side of the sheet adjacent the portion of the mold cavity desired to limit the heat transfer rate to locally control the heat transfer rate of a portion of the mold cavity surface to produce a desired effect on the molded object.

According to one embodiment of the present invention, a pressure compensating molding system is provided. The molding system includes a mold with two halves or sections. Each mold half includes a die sheet that separates the mold cavity from a heating/cooling cavity. The die sheet has a surface shaped to produce a desired component. The shape of the die sheet is maintained during molding by monitoring the pressure in the mold cavity and in the heating/cooling cavity behind the die sheet, and controlling the pressure in the heating/cooling cavity to be substantially equal to the pressure in the molding cavity. The die sheet is a relatively thin sheet that provides for rapid heating and cooling. The heating/cooling cavity receives fluid of an appropriate temperature to control the temperature of the die sheet. By injecting heated fluid into the heating/cooling cavity, the die sheet temperature is raised to a desired temperature prior to and/or during the molding stage thereby increasing moldability and improving the quality of the molded components. In various embodiments, the desired temperature ranges from an ambient room temperature up to above the softening or melting temperature of the molding material. In one embodiment, the heated fluid is steam. In another embodiment, the heated fluid is a liquid.

In one embodiment, a controller operates a plurality of valves connected to a heater and a cooler. The controller monitors pressure sensors measuring the pressure in the molding cavity and the heating/cooling cavities. The controller also operates a pressure generator to ensure that the pressure in the heating/cooling cavities is substantially equal to the pressure in the molding cavity.

In operation, the valves are configured to allow heated fluid to flow through the heating/cooling cavities in the mold. After the die sheet reaches a specified temperature, the molding material is injected into the mold. The valves are operated to direct cool fluid into the mold. After the cool fluid fills the mold, the mold is isolated from the cool fluid supply. The pressure of the mold material in the mold cavity is monitored, along with the pressure in each heating/cooling cavity. The pressure in the heating/cooling cavities is regulated to minimize the differential pressure between the mold cavity and each heating/cooling cavity. After the pressure of the molding material falls below a minimum value, the isolation valves for the mold are opened and the cooled fluid is circulated in the mold to complete the cooling of the molded component. The molded component is then ejected from the mold and the process repeats, starting with heating the mold.

In another embodiment, the molding system includes a melt pipe. The melt pipe is a jacketed conduit. The conduit is defined by a thin member that separates the conduit from the jacket. The jacket receives fluid at a specified temperature and pressure to minimize the heat loss of the molding material in the conduit. The melt pipe allows transporting of the molding material to another section of the mold cavity while maintaining the molding material temperature within limits. The melt pipe also allows the molding material to be transported to a second, or cascaded, mold. In various embodiments, the melt pipe is configured to allow removal of solidified molding material either by being longitudinally hinged or by having an ejector push the solidified melt out of the conduit.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for and a method of operating a pressure compensating molding system 100 are disclosed. It is desirable to maintain the mold die surfaces 402 at a high temperature during the beginning of the molding cycle in order to maintain the molding material 218 in a molten or semi-molten state as it fills the mold cavity 204. With a higher and more consistent temperature across the mold die surfaces 402, less pressure is required for forcing the molding material 218 into the mold and less imperfections on the molded component surface will result. Although the following description uses injection molding as an example, the molding system 100 is suitable for other plastic molding processes, such as structural foam molding low pressure molding, transfer molding, and blow molding. The system 100 is also suitable for processing thixotropic plastic and metal alloys.

Figure 1:
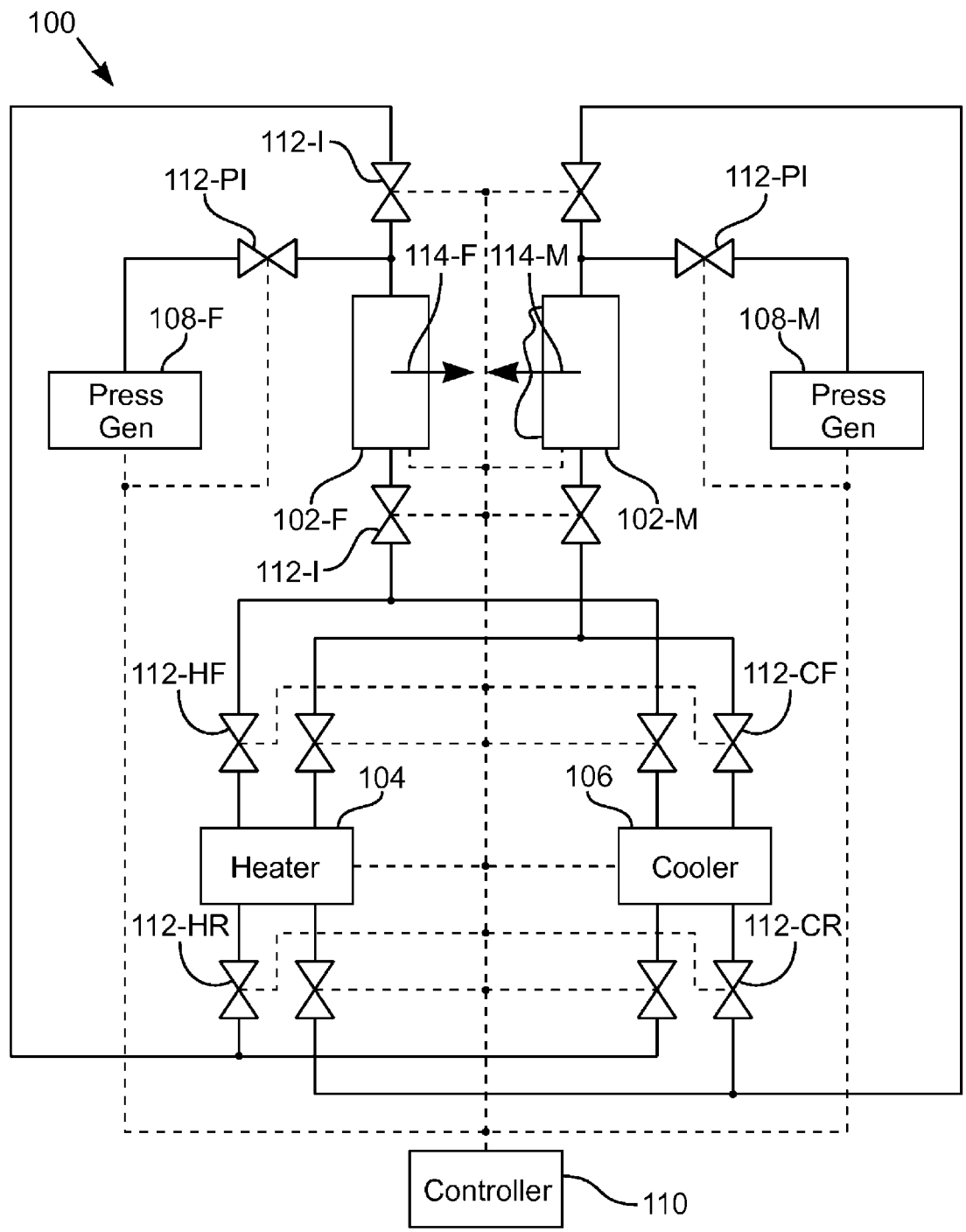
FIG. 1 is a piping and control diagram of one embodiment of the pressure compensating molding system.

FIG. 1 illustrates a piping and control diagram of one embodiment of the pressure compensating molding system 100. A mold 102 includes a female mold section, or half, 102-F and a male mold section, or half, 102-M illustrated in FIG. 1 in the open position. The two mold halves 102-F, 102-M are mated 114-F, 114-M to be in a closed position to begin the molding process. Each mold half 102-F, 102-M is connected to a pair of isolation valves 112-I that isolate the mold 102 from the remainder of the system 100.

The system 100 includes a heater 104 that heats a fluid 210 above the softening or melting temperature of the molding material 218. The system 100 also includes a cooler 106 that cools the fluid for rapid cooling of the mold 102 and the molding material 218. The heater 104 includes a pair of heater feed valves 112-HF, each in fluid communication with one of the mold isolation valves 112-I. The mold isolation valve 112-I on the outlet side of each mold half 102-F, 102-M is in fluid communication with one of a pair of heater return valves 112-HR that control the fluid entering the heater 104. The cooler 106 includes a pair of cooler feed valves 112-CF, each in fluid communication with one of the mold isolation valves 112-I. The mold isolation valve 112-I on the outlet side of each mold half 102-F, 102-M is in fluid communication with one of a pair of cooler return valves 112-CR that control the fluid entering the cooler 106.

The system 100 includes a pair of pressure generators 108-F, 108-M, one for each mold half 102-F, 102-M. Each pressure generator 108 is isolated from the mold 102 by a pressure isolation valve 112-PI. The pressure generator 108 is a device that causes the pressure in the corresponding heating/cooling cavity 202 of the mold half 102-F, 102-M to be controlled to a pressure equal to the injection pressure of the molding material 218.

A controller 110 is operatively connected to the various valves 112, the heater 104, the cooler 106, the pair of pressure generators 108, and to instruments monitoring parameters associated with the mold 102. The controller 110 monitors and controls the process for operating the pressure compensating molding system 100. In various embodiments, the parameters measured include temperature and pressure.

As used herein, the controller 110 should be broadly construed to mean any device that accepts inputs and provides outputs based on the inputs, for example an analog control device or a computer or component thereof that executes software. In various embodiments, the controller 110 is one of a specialized device or a computer for implementing the functions of the invention. The controller 110 includes input/output (I/O) units for communicating with external devices and a processing unit that varies the output based on one or more input values. A computer-based controller 110 includes a memory medium that stores software and data and a processing unit that executes the software. Those skilled in the art will recognize that the memory medium associated with the computer-based controller 110 can be either internal or external to the processing unit of the processor without departing from the scope and spirit of the present invention.

The input component of the controller 110 receives input from external devices, such as pressure sensors and valve position sensors. The output component sends output to external devices, such as the various valves 112. The storage component stores data and program code. In one embodiment, the storage component includes random access memory and/or non-volatile memory.

Figure 2:
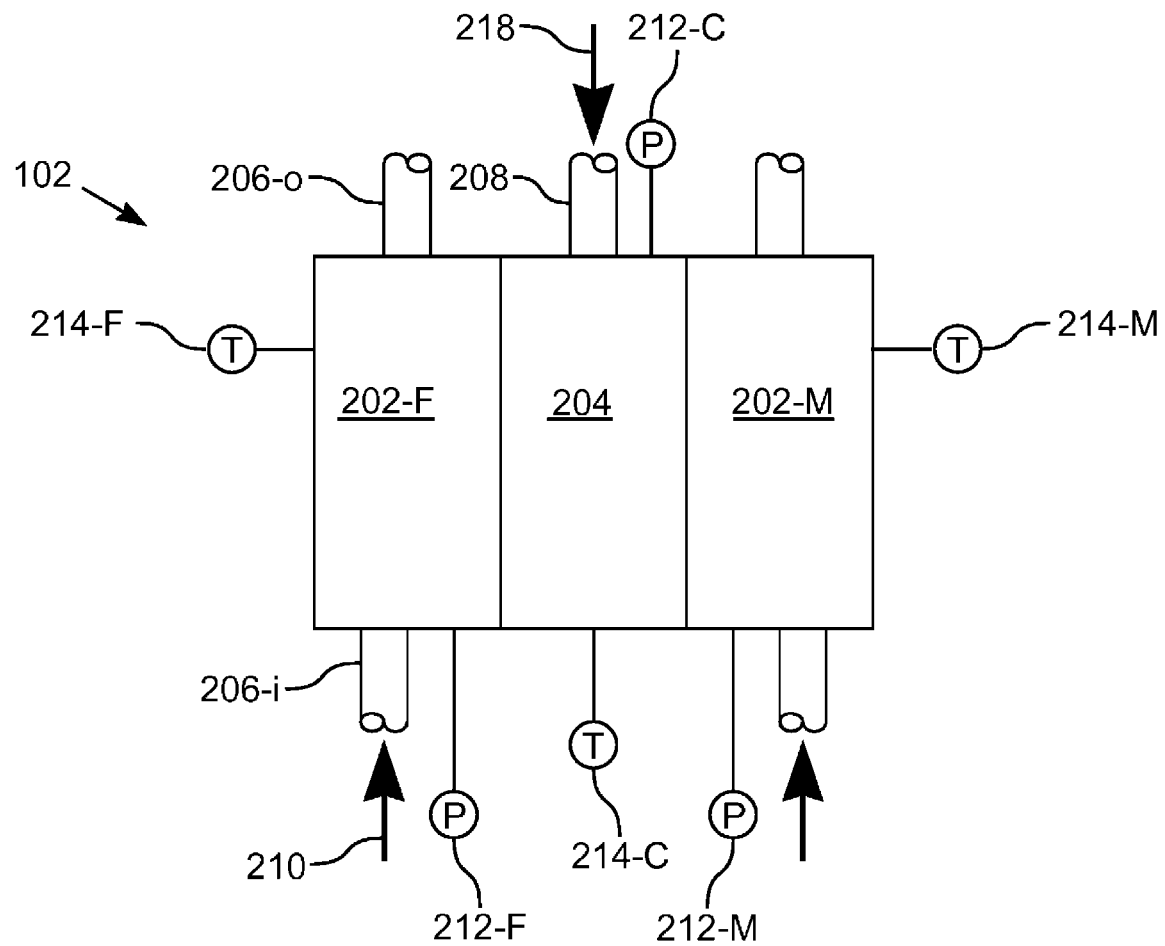
FIG. 2 is a symbolic diagram of one embodiment of the mold, including the mold cavity and the heating/cooling cavities.

FIG. 2 illustrates a symbolic diagram of one embodiment of the mold 102, including the mold cavity 204 and the heating/cooling fluid cavities 202. Each of the cavities 202, 204 defined by the mold 102 includes a pressure sensor 212 in communication with the controller 110. Each mold half 102-F, 102-M has a corresponding heating/cooling cavity 202-F, 202-M with a corresponding pressure sensor 212-F, 212-M. The mold cavity 204, which is formed when the two mold halves 102-F, 102-M are in the closed position, is monitored by a pressure sensor 212-C.

Each mold half 102-F, 102-M receives fluid 210 through an inlet port 206-i and discharges that fluid through an outlet port 206-o. The fluid 210 is selectively heated or cooled by the heater 104 or cooler 106, respectively. The mold cavity 204 receives the molding material 218 through a sprue 208.

Also illustrated in FIG. 2 are temperature sensors 214 for each of the cavities 202-F, 204, 202-M. The temperature of the molding material 218 is sensed by one or more temperature sensors 214-C. Also, the temperature of the fluid in the fluid chambers 202-F, 202-M are sensed at one or more locations by one or more temperature sensors 214-F, 214-M. In one embodiment, the temperature sensors 214 provide inputs to the controller 110.

In another embodiment, the fluid cavities 202-F, 202-M are connected to a fluid system that has the fluid 210 pressurized to the level required to match the pressure of the molding material 210 in the mold cavity 204. In such an embodiment, the isolation valves 112-I are not necessary to isolate the pressurized mold cavity 204 from the remainder of the fluid system. In one such embodiment, the pressure of the fluid 210 is controlled as the fluid 210 is circulated through the mold cavity 204 during the molding process.

Figure 3:
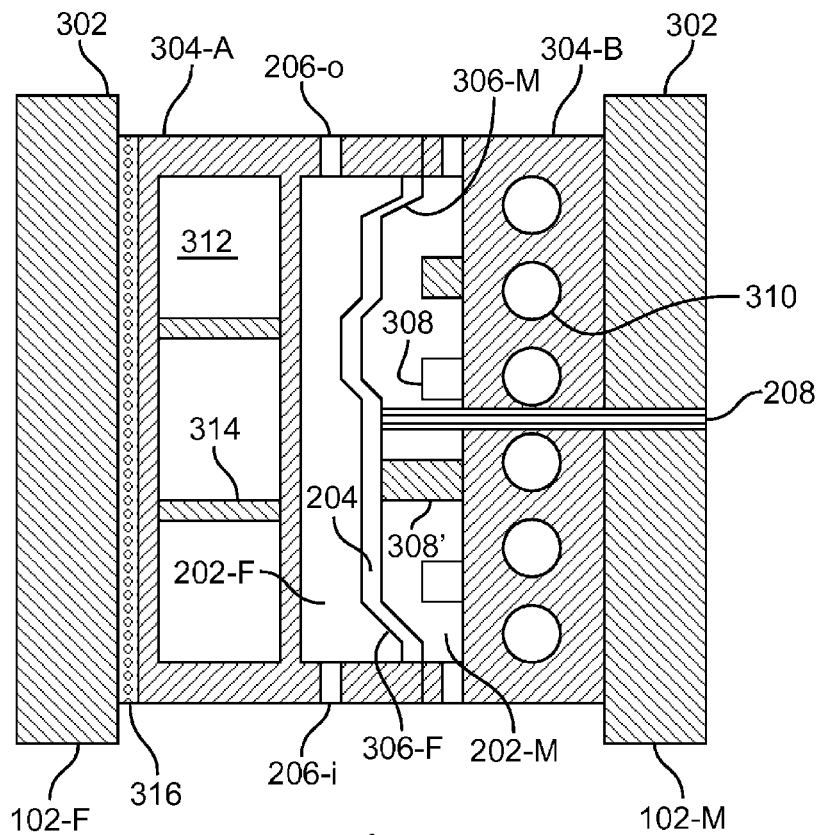
FIG. 3 is cross-sectional view of two mold halves in the closed position.

FIG. 3 illustrates a cross-sectional view of two mold halves 102-F, 102-M in the closed position. The female mold half 102-F includes a platen 302, one embodiment of a die support 304-A, and a female die sheet 306-F. The male mold half 102-M includes a platen 302, another embodiment of a die support 304-B, and a male die sheet 306-M. The gap between the die sheets 306-F, 306-M defines the mold cavity 204. The opposite side of the die sheets 306-F, 306-M and the inside surface of the die support 304-A, 304-B adjacent the die sheets 306-F, 306-M defines the heating/cooling, or fluid, cavities 202-F, 202-M. In one embodiment, the die sheets 304 have a low thermal mass due to the thickness of the sheets 304 being less that that required to withstand the pressure of the molding material 218 entering the mold cavity 204. The pressure of the fluid 210 in the fluid cavity 202 provides structural integrity for the die sheets 306 to resist deformation.

The embodiment of the die support 304-A illustrated for the female mold half 102-F includes a chamber 312 between the heating/cooling cavity 202-F and the platen 302. The chamber 312 includes supports 314 that are perpendicular to the plane of the platen 302. The supports 314 provide structural support to the wall of the heating/cooling cavity 202-F that is nearest the platen 302. In one embodiment, the chamber 312 is filled with a cooling fluid when it is desired to remove heat from the mold 102 and to maintain the platen 302 within an operating temperature range. In another embodiment, the chamber 312 is filled with air or other gas, which serves as an insulator.

The illustrated embodiment of the die support 304-A also includes an insulator 316 adjacent the platen 302. The insulator 316 impedes the heat transfer between the die support 304-A and the platen 302. The platens 302 attach to a molding machine that positions the mold halves 102-F, 102-M to support the molding process.

The illustrated embodiment of the heating/cooling cavity 202-M in the die support 304-B includes a plurality of obstructions 308 that are protruding members arranged in an alternating pattern on the surface of the cavity 202-M nearest the platen 302. In other embodiments, the obstructions 308 have one or more shapes and configurations that protrude into the cavity 202-M. The obstructions 308 have a shape that creates turbulent flow conditions when the fluid 210 flows from the inlet port 206-i to the outlet port 206-o. The turbulent flow condition aids in the heat transfer between the die sheet 306-M and the fluid 210.

In one such embodiment, one or more of the obstructions 308' are stanchions that extend to the die sheet 306-M and provides support to the die sheet 306-M to resist deformation when the molding material 218 enters the mold cavity 204. The number and placement of the stanchions 308' are determined by the overall size, thickness, and material of the insert. The need for such stanchions 308' is reduced because the low thermal mass of the die sheets 304 and the temperature of the fluid 210 in the fluid cavities 202 serve to reduce the injection pressure because the molding material 218 remains fluid as it enters the mold cavity 204 and does not require as much force to fill the mold cavity 204. The lower injection pressure reduces the need for stiffness and support in the construction of the mold 102, resulting in less need for stanchions 308' and in thinner die sheets 304.

The embodiment of the die support 304-B illustrated for the male mold half 102-M includes a plurality of conduits 310 between the heating/cooling cavity 202-M and the platen 302. In one embodiment, fluid flows in the conduits 310 when it is desired to remove heat from the mold 102 and to maintain the platen 302 within an operating temperature range.

The configuration of the illustrated die sheet 306 is exemplary and one skilled in the art will recognize that the die sheets 306 will have a shape configured to produce a desired molded component or object. The sprue 208 is positioned near the center of the die sheet 306-F. In one embodiment, the die sheet 306 is an electroform component, such as one fabricated of a nickel alloy or of copper. In other embodiments, the die sheet 306 is made of other materials and formed by other processes, such as vapor formed metal, stamped metal, cast metal, forged metal, die castings, sprayed metal, or explosion formed metal. In yet another embodiment, the die sheet 306 is formed of a plastic or polymer, such as ones reinforced with glass fibers, carbon fibers, and/or wire.

Figures 4A, 4B:
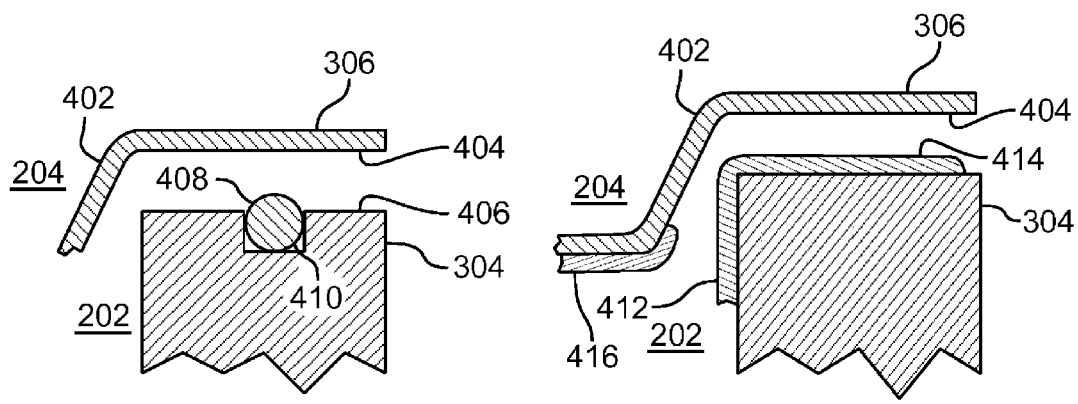
FIG. 4a is a partial exploded cross-sectional diagram of one embodiment of the seal between the die sheet and the die support.
FIG. 4b is a partial exploded cross-sectional diagram of another embodiment of the seal between the die sheet and the die support.

FIG. 4a illustrates a partial exploded cross-sectional diagram of one embodiment of the seal between the die sheet 306 and the die support 304. The die support 304 includes a flat surface, or rim, 406 that is adjacent the bottom surface 404 of the die sheet 306. The flat surface 406 of the die support 204 includes a groove 410 that contains a seal 408 such as an O-ring. The O-ring 408 is compressed when the die sheet 306 is attached to the die support 204. In one embodiment, the die sheet 306 is attached to the die support 304 with a fastener, such as a countersunk fastener. In other embodiments, the die sheet 306 is sealed to the flat surface 406 of the die support 304 with a lip seal, a seal formed by mating two matched surfaces, or other means for sealing two flat surfaces 404, 406. With the die sheet 306 attached to the die support 304, the heating/cooling cavity 202 is sealed around the perimeter of the die sheet 306.

The die sheet surface 402 opposite the surface 404 adjacent the die support 204 is the surface 402 that defines the mold cavity 204 and is in contact with the molding material 218. When required, the mold cavity surface 402 is a Class A surface. The surface 204 is textured and/or grained in various embodiments.

FIG. 4b illustrates a partial exploded cross-sectional diagram of another embodiment of the seal between the die sheet 306 and the die support 304. The illustrated embodiment shows an insulating layer 412 adjacent the die support 304 and that covers the surface of the die support 304 inside the fluid chamber 202. The insulating layer 412 insulates the die support 304 from the fluid 210 in the fluid chamber 202. The insulating layer 412 increases efficiency by reducing the heat transfer and thermal losses between the fluid 210 in the fluid chamber 202 and the die support 304 and platen 302. The efficiency is achieved for both the heating and cooling cycles of the mold 102.

The insulating layer 412 has a sealing portion 414 that is positioned between the die support 304 and the surface 404 of the die sheet 306 that is adjacent the fluid chamber 202. When the die sheet 306 is attached to the die support 304, the sealing portion 414 of the insulating layer 412 seals the fluid cavity 202. With the die sheet 306 attached to the die support 304, the heating/cooling cavity 202 is sealed around the perimeter of the die sheet 306. Further, the sealing portion 414 of the insulating layer 412 provides an amount of thermal isolation between the die sheet 306 and the die support 304, which serves to increase efficiency. In another embodiment, the insulation layer 412 extends only along the portion of the die support 304 that defines the fluid cavity 202 and not on the rim. In such an embodiment, another sealing means, such as the O-ring 408 provides a seal between the die sheet 306 and the die support 304.

In various embodiments, the insulating layer 412 is fabricated in place, such as by hand lay-up, or cast or spray techniques. The insulating layer 412 has a low thermal conductivity and is compatible with the fluid 210 at its operating temperature and pressure. Examples of suitable material for the insulating layer 412 include epoxies, silicones, and urethane, either neat or filled with hollow beads or other fillers or reinforcements.

FIG. 4b also illustrates an embodiment of a local insulator 416 attached to the surface 404 of the die sheet 306 that is adjacent the fluid chamber 202. The local insulator 416 is positioned at a location where it is desired to limit the heat transfer from the mold cavity 204 at a specific location. That is, the heat transfer between the mold cavity 204 and the fluid cavity 202 is less where the local insulator 416 is positioned. For certain molded objects, limiting the heat transfer rate at specific areas produces certain effects. For example, the local insulator 416 is positioned adjacent an area of the mold cavity where the molding material 218 has a certain thickness or it is desirable for waste material control.

Figure 5:
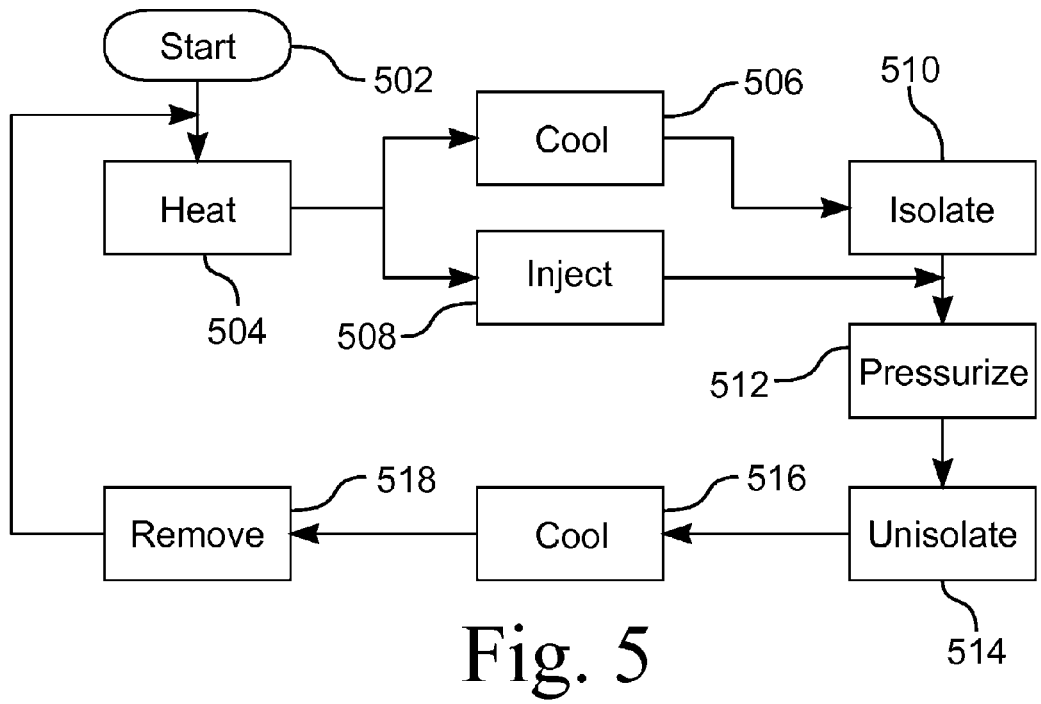
FIG. 5 is a flow diagram of one embodiment of the method for injection molding with pressure compensation.

FIG. 5 illustrates a flow diagram of one embodiment of the method for injection molding with pressure compensation. To start 502 the process, the first step 504 is to heat the mold 102. The heater feed valves 112-HF, heater return valves 112-HR, and the mold isolation valves 112-I are opened to allow heated fluid 210 to flow through the heater/cooler cavities 202 to raise the temperature of the die sheets 306 to a selected, or desired, temperature. In various embodiments, the desired temperature ranges from ambient to above the softening or melting temperature of the molding material 218. The desired temperature is selected to be a temperature that produces a molded component having desired qualities, for example, no or a minimal number of visible flow lines on the molded component's surface. In other embodiments, the desired temperature is selected to be greater than that needed to produce a molded component having the desired qualities, but with the desired temperature falling to an appropriate temperature by the time the molding material is in a position to be affected by the temperature of the die sheets 306. After the die sheets 306 reach the desired temperature, step 508 of injecting the molding material 218 into the mold cavity 204 begins.

In various embodiments, the step 506 of cooling the mold 102 begins before, at the same time, or after the step 508 of injecting. The step 506 of cooling includes closing the heater feed valves 112-HF and the heater return valves 112-HR and opening the cooler feed valves 112-CF and the cooler return valves 112-CR to fill the heater/cooler cavities 202 with cooled fluid 210. The step 510 of isolating the mold 102 is performed after the heater/cooler cavities 202 are filled with cooled fluid 210. The step 510 includes closing the mold isolation valves 112-I. The cooling effect of the cooled fluid 210 introduced in the heating/cooling cavity 202 does not impact the molding material 218 flowing into the mold cavity 204. That is, the injection of the molding material 218 occurs in such a short time that the heat transfer to the cooling fluid 210 does not significantly lower the temperature of the die sheet surface 402 before the molding material 218 has obtained the benefit of the heated die sheet surface 402 and has filled the mold cavity 204.

With the cooler feed valves 112-CF and the cooler return valves 112-CR closed, the next step 512 of pressurizing the cavities 202, 204 is performed. In one embodiment, the pressure applied in the step 512 of pressurizing is intentionally increased to cause a distortion of the die sheet 306 by reducing the volume of the mold cavity 204. This results in a thinner molded object than normal. After step 516 of cooling is performed, the process is repeated by with less pressure applied at step 512 of pressurizing. A second molding material 218 can be injected into the gap formed when the mold cavity 204 returns to its normal configuration. In this way special effects are produced in the molded object, such as two-tone surfaces and/or different tactile surfaces.

After the pressurizing step 512, the next step 514 is unisolate the mold 102 by opening the cooler feed valves 112-CF and the cooler return valves 112-CR, which allows the next step 516 to start. The step 516 of cooling includes allowing cool fluid 210 to flow through the heater/cooler cavities 202. After the molding material 218 hardens, the next step 518 is to remove the molded component from the mold 102 by separating the two mold halves 102-F, 102-M. In one embodiment, ejector rods are used in this step 518 to aid in the removal of the molded component from the mold 102. After the molded component is removed, the mold halves 102-F, 102-M returns to the closed position and process repeats with the step 504 of heating.

In another embodiment, the mold 102 is not isolated. That is, the steps 510, 512 of isolating and unisolating are not performed. In such an embodiment, the fluid 210 is pressurized in step 512 by adjusting the pressure of the fluid 210 to the desired level. In one such embodiment the pressurization step 512 is performed with the fluid 210 flowing through the mold 102. In another embodiment, the pressurization step 512 is performed with the fluid 210 not flowing through the mold 102.

Figure 6:
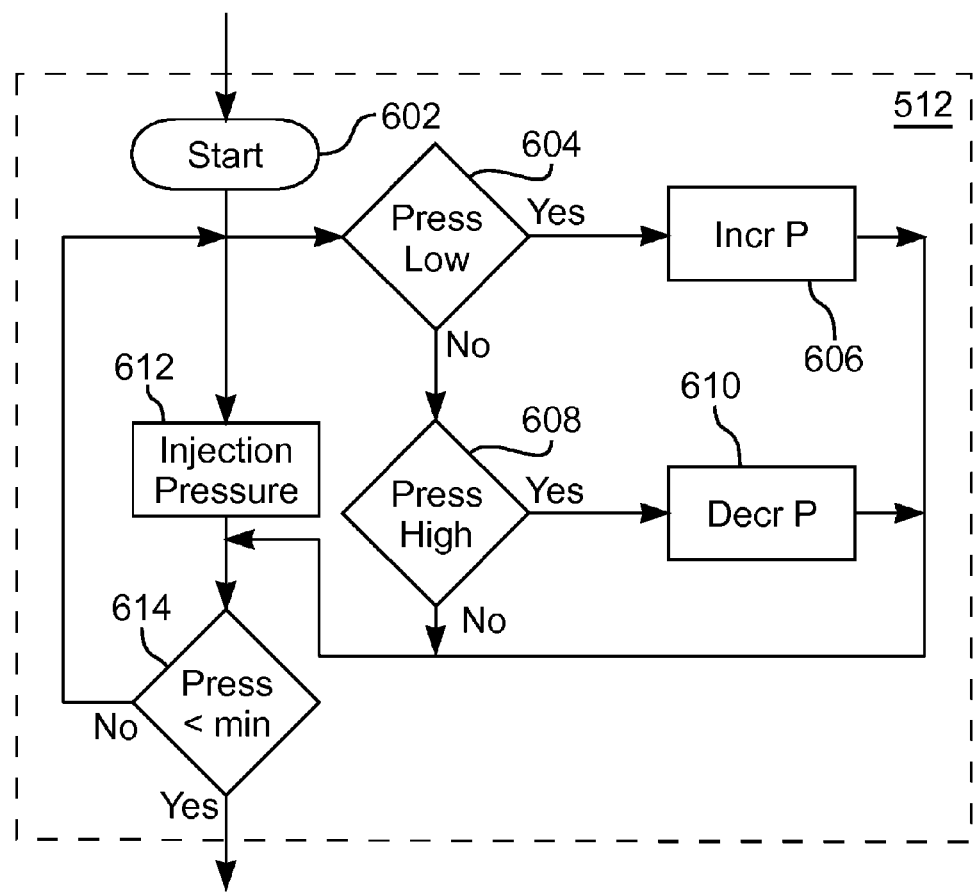
FIG. 6 is a flow diagram of one embodiment of the process step for equalizing pressure between the mold cavity and the heating/cooling cavities.

FIG. 6 illustrates a flow diagram of one embodiment of the step 512 for equalizing pressure between the mold cavity 204 and the heating/cooling cavities 202. The pressurizing step 512 starts 602 when there is a differential pressure between the mold cavity 204 and one or both of the heating/cooling cavities 202-F, 202-M. That is, when the pressure sensor 212-C indicates a pressure different than either of the pressure sensors 212-F, 212-M. The step 612 for injection pressure reflects that pressure of the molding material 218 increases as the molding material 218 is forced into the mold cavity 204. At the same time, the decision step 604 of whether the pressure is low in either of the heating/cooling cavities 202-F, 202-M is performed. If the pressure is low in either of the heating/cooling cavities 202-F, 202-M, then the step 606 of increasing the pressure in the low pressure cavity 202 is performed. If the pressure is not low, then the decision step 608 of whether the pressure is high in either of the heating/cooling cavities 202-F, 202-M is performed. If the pressure is high in either of the heating/cooling cavities 202-F, 202-M, then the step 610 of decreasing the pressure in the high pressure cavity 202 is performed. If the pressure in either of the heating/cooling cavities 202-F, 202-M is not high, then decision step 614 of whether the pressure in the mold cavity 204 is less than a minimum pressure is performed. If the pressure in the mold cavity 204 is above a minimum value, then the pressure equalization steps 604, 606, 608, 610, 612 repeat, otherwise, the step 512 is exited.

The steps 606, 610 of increasing and decreasing the pressure in the appropriate heating/cooling cavities 202 is accomplished by the corresponding pressure generator 108. In one embodiment, the pressure generator isolation valve 112-PI is opened and the pressure generator 108 operates to equalize the pressure in the heating/cooling cavity 202 to that in the mold cavity 204. In one such embodiment, the pressure generator 108 includes a piston that is operated by a hydraulic system. The piston isolates the hydraulic system from the fluid 210 in the cavity 202. In another embodiment, the pressure generator 108 pressurizes the cavity 202 to a maximum value and then relieves the pressure in the cavity 202 as the pressure in the mold cavity 204 falls with the cooling of the molding material 218.

Figure 7:
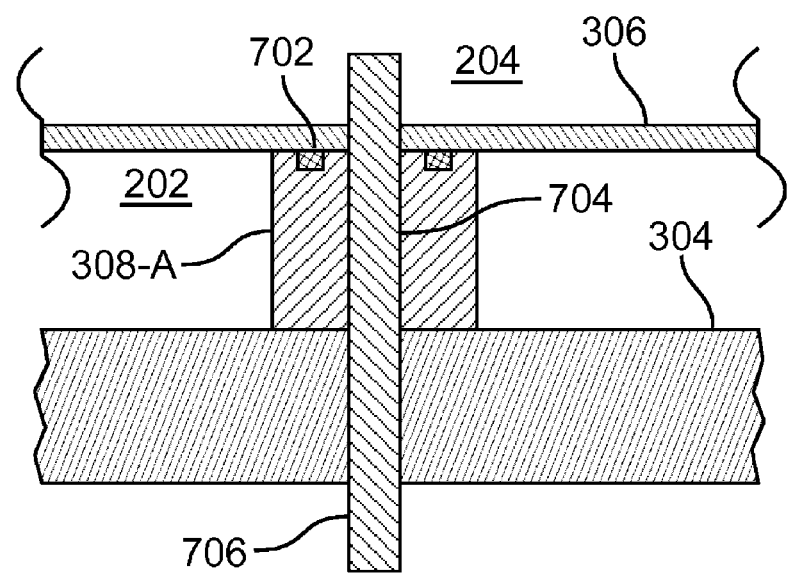
FIG. 7 is a partial cross-sectional view of one embodiment of an ejector stanchion.

FIG. 7 illustrates a partial cross-sectional view of one embodiment of an ejector stanchion 308-A. The stanchion 308-A has one end attached to the die support 304, such as by a weld or other sealing attachment means. The other end of the stanchion 308-A adjacent to the die sheet 306 has a groove with seal 702 for making a seal between the stanchion 308-A and the die sheet 306. In various embodiments the seal 702 is an O-ring or other resilient material that prevents passage of the fluid 210 into the mold cavity 204 and prevents the passage of molding material 218 into the fluid cavity 202. In another embodiment, the stanchion 308-A has a seal 702 on both ends, with the opposite seal 702 preventing passage of the fluid 210 from the fluid cavity 202 into the through-opening 704.

The stanchion 308-A has a through-opening 704 configured to receive an ejector 706. The ejector 706 is illustrated in the ejecting position where the end of the ejector 706 extends into the mold cavity 204. In another embodiment, the stanchion 308-A is configured to receive a slide that is positioned in the mold cavity 204 during molding and removed from the cavity 204 when the molded object is ejected from the mold. In still other embodiments, the through-opening 704 is configured to provide a vacuum or pressure conduit to the mold cavity 204.

Figure 8:
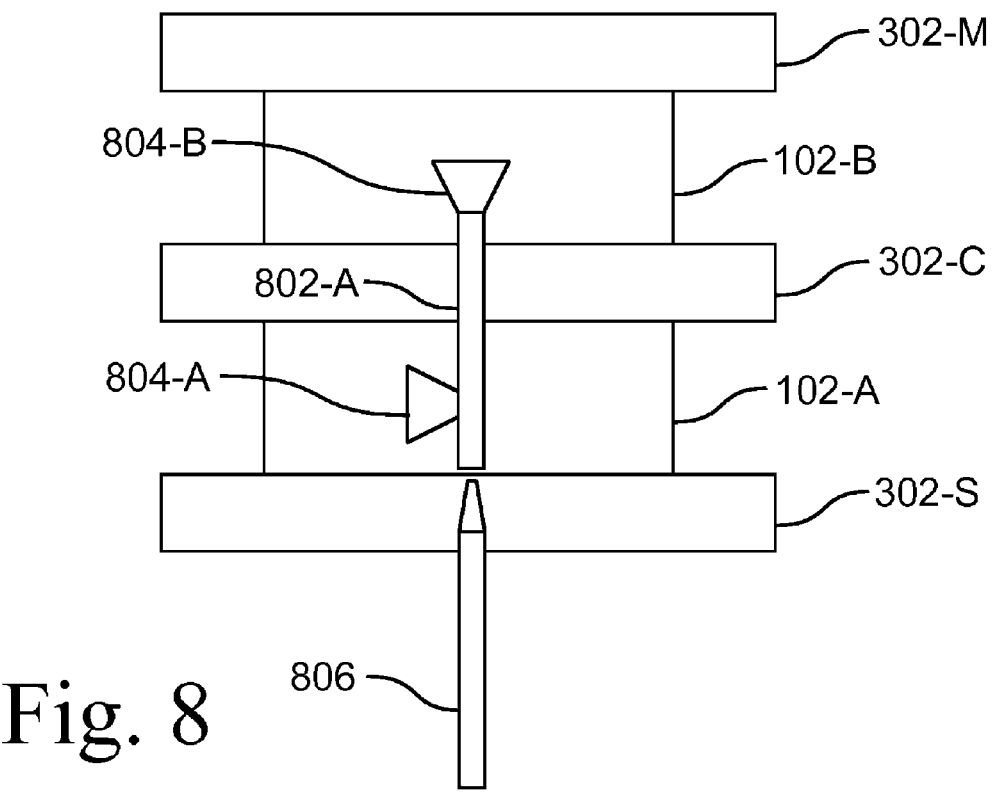
FIG. 8 is a symbolic diagram of one embodiment of a melt pipe feeding multiple molds.

FIG. 8 illustrates a symbolic diagram of one embodiment of a melt pipe 802-A feeding multiple molds 102-A, 102-B. A stationary platen 302-S supports a first mold 102-A, a center platen 302-C, and a second mold 102-B. A movable platen 302-M compresses the molds 102 against the stationary platen 302-S. An injection barrel and nozzle 806 feeds a receiver sprue bushing 1004 of the melt pipe 802-A. The melt pipe 802-A includes a pair of fan gates 804-A, 804-B that provide molding material 218 to each of the molds 102-A, 102-B, respectively. The illustrated embodiment shows multiple molds 102 operated at once with molding material 218 being transported to each mold 102-A, 102-B from a single nozzle 806.

Figure 9:
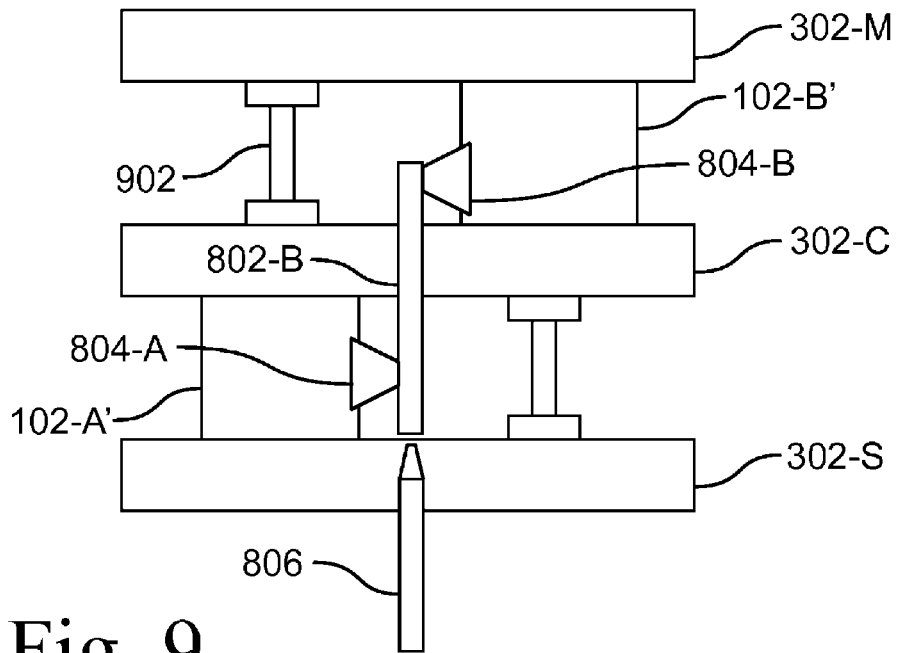
FIG. 9 is a symbolic diagram of another embodiment of a melt pipe feeding multiple molds.

FIG. 9 illustrates a symbolic diagram of another embodiment of a melt pipe 802-B feeding multiple molds 102-A', 102-B'. A stationary platen 302-S supports a first mold 102-A', a center platen 302-C, and a second mold 102-B'. The first mold 102-A' and the second mold 102-B' are of a size and configuration that causes an imbalance when the movable platen 302-M compresses the molds 102-A', 102-B'. To balance the platens 302-C, 302-M, offset tools, or deadman supports, are used to ensure that the platens 302-S, 302-C, 302-M apply a balanced force to the molds 102-A', 102-B'.

FIGS. 8 and 9 illustrate the different configurations in which a melt pipe 802 is used to transport molding material 218 to different molds 102. Each of the molds includes a fluid cavity 202 for cycling the heating and cooling in conjunction with the molding processing. In still another embodiment, the mold 102 is of a size and configuration where it is desirable to inject the molding material 218 at multiple locations. In such an embodiment, the melt pipe 802 transports the molding material 218 to the locations desired in the mold 102.

Figure 10:
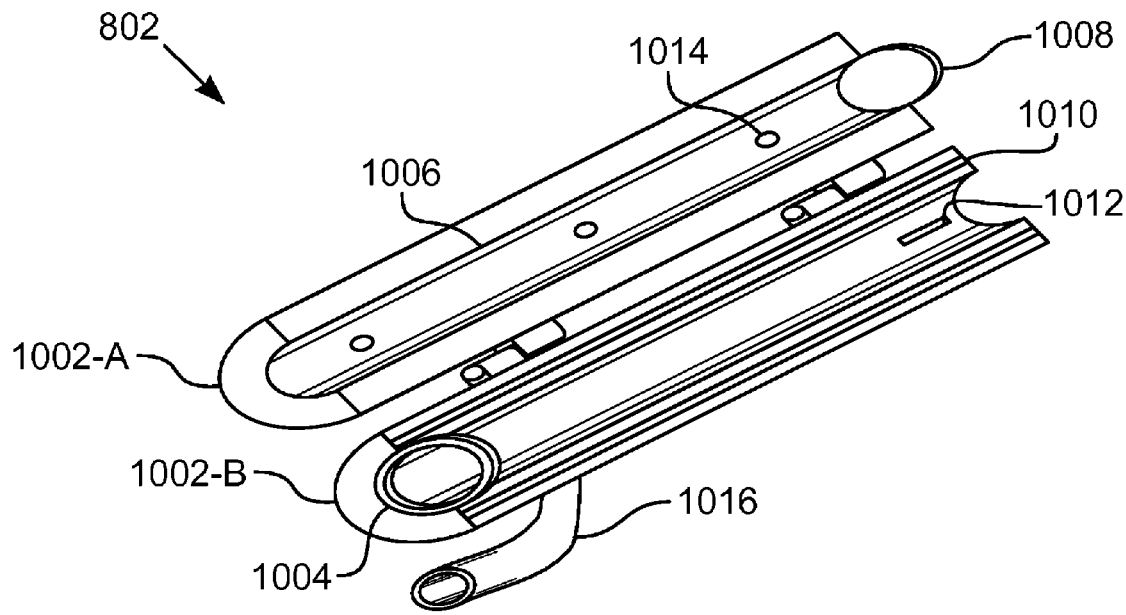
FIG. 10 is a perspective view of one embodiment of a heat pipe.

FIG. 10 illustrates a perspective view of one embodiment of a melt pipe 802. The melt pipe 802 is a jacketed conduit that maintains the temperature of the molding material 218 as the material 218 is transported to different molds 102 or to different locations within a single mold 102. The melt pipe 802 includes a conduit 1006 that carries the molding material 218. In the illustrated embodiment, the melt pipe 802 is hinged longitudinally with seals 1010 on opposite sides of the conduit 1006. The seals 1010 one the hinged half 1002-B engage the other half 1002-A to seal the conduit 1006.

The illustrated embodiment of the melt pipe 802 includes three ejectors 1014 that release the sprue, or solidified molding material 218, from the conduit 1006. In another embodiment, the melt pipe 802 is not hinged and the conduit 1006 is a single passage. The sprue is removed from the conduit 1006 by an ejector rod or other mechanism, similar to a core pull, that removes the sprue from the conduit 1006.

The inlet end of the melt pipe 802 has a receiver sprue bushing 1004 that receives the outlet of an injection barrel and nozzle 806. The opposite end of the pipe 802 has a plug 1008. The conduit 1006 has at least one outlet 1012 that supplies a fan gate 804 or other type of connection to the mold cavity 204. The illustrated embodiment shows the conduit 1006 as being cylindrical. In other embodiments the conduit 1006 has other configurations that facilitate demolding, such as with an elliptical or diamond-shaped cross-section.

The melt pipe 802 includes a jacket around the conduit 1006. The conduit 1006 is defined by a thin sheet that separates the conduit 1006 from the jacket that receives fluid 210 in a manner similar to that described for the fluid cavity 202 of the mold 102. One half 1002-A of the melt pipe 802 is attached to a molding system component and includes an inlet and outlet for the fluid 210. The other, hinged half 1002-B includes flexible hoses 1016 that receive and discharge the fluid 210. When the molding material 218 is injected into the mold 102, the fluid 210 in the jacket is at a temperature that prevents the temperature of the molding material 218 from decreasing below a specified temperature, which is above the melting temperature of the molding material 218. At the same time, the pressure of the fluid 210 is substantially equal to the pressure of the molding material 218 in the conduit 1006, thereby ensuring the structural integrity of the sheet forming the conduit 1006. After the mold 102 is filled, fluid 210 at a lower temperature is circulated through the jacket to aid in the curing or solidifying of the molding material 218 that remains in the conduit 1006.

The pressure compensating molding system 100 includes various functions. The function of maintaining the structural integrity of the die sheet 306 is implemented, in one embodiment, by varying the pressure in the heating/cooling cavities 202 to maintain a differential pressure between the cavities 204, 202 within a specified limit.

The function of maintaining the die sheet 306 at a specified temperature is implemented, in one embodiment, by the heated fluid 210 in the heating/cooling cavities 202. The function of cooling the mold 102 is implemented, in one embodiment, by the cooling fluid 210 in the heating/cooling cavities 202.

From the foregoing description, it will be recognized by those skilled in the art that a pressure compensating molding system 100 has been provided. A thin die sheet 306 defines a mold cavity 204. The structural integrity of the die sheet 306 is maintained during the pressure excursions of the molding process by controlling and minimizing the differential pressure between the mold cavity 204 and the cavity 202 on the opposite side of the die sheet 306. Also, the temperature of the die sheet 306 is readily controlled because the die sheet 306 is thin with low specific heat capacity. The cavity 202 on the opposite side of the mold cavity 204 receives alternatingly a heated and a cooled fluid 210 for heating and cooling the die sheet 306 at appropriate times. Although the illustrated embodiments illustrated relate to injection molding, the pressure compensating molding system 100 is also suitable for other plastic molding techniques, for example, structural foam molding, low pressure molding, transfer molding, and blow molding.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for molding, said apparatus comprising:
    a die sheet having a first surface defining a mold cavity and a second surface opposite said first surface, said die sheet configured and dimensioned to mate to a mating mold section;
    a die support having a rim that contacts a portion of said second surface of said die sheet, said rim forming a seal with said die sheet, said second surface and said die support defining a fluid cavity, said fluid cavity having an inlet and an outlet, said fluid cavity configured to receive a fluid in said inlet and discharge said fluid in said outlet, said fluid being a liquid;
    a first pressure sensor measuring a mold pressure of said mold cavity;
    a second pressure sensor measuring a cavity pressure of said fluid cavity;
    a pair of isolation valves each in fluid communication with one of said inlet and outlet;
    a pressure generator in fluid communication with said fluid cavity, said pressure generator configured to pressurize said fluid cavity when said pair of isolation valves are closed; and
    a controller monitoring said first and second pressure sensors, said controller operatively connected to said pair of isolation valves, said controller configured to operate said pressure generator to maintain said cavity pressure substantially the same as said mold pressure when said pair of isolation valves are closed, said controller executing a process including
    (a) circulating said liquid at a first temperature through said fluid cavity with said pair of isolation valves open and before injecting a molding material into said mold cavity and with said liquid flowing through said pair of isolation valves, (b) circulating said liquid at a second temperature through said fluid cavity with said pair of isolation valves open and while injecting said molding material, (c) closing said pair of isolation valves, (d) controlling said cavity pressure to be substantially the same as said mold pressure until said mold pressure falls below a specified value, and (e) opening said pair of isolation valves and circulating said liquid at a third temperature through said fluid cavity.

2. The apparatus of claim 1 further including at least one obstruction protruding into said fluid cavity, said at least one obstruction configured to disrupt a flow of a fluid flowing through said fluid cavity.

3. The apparatus of claim 1 further including a stanchion extending from said die support to said die sheet, said stanchion configured and dimensioned to support said die sheet against a pressure in said mold cavity.

4. The apparatus of claim 1 further including an insulator adjacent said die support in said fluid cavity.

5. The apparatus of claim 1 further including a melt pipe having a jacket in fluid communication with said fluid cavity.

6. The apparatus of claim 1 further including a melt pipe having a jacket in fluid communication with said fluid cavity, said melt pipe including a thin member defining a conduit, said thin member separating said conduit from said jacket.

7. An apparatus for molding, said apparatus comprising:
    a die sheet separating a mold cavity from a fluid cavity, said die sheet having a thickness less than required to withstand a first pressure in said mold cavity without deformation; and
    a die support connecting said die sheet to a platen, said die sheet and said die support defining said fluid cavity, said fluid cavity configured to receive and contain a fluid having a second pressure substantially equal to said first pressure, said fluid being a liquid;
    a plurality of isolation valves in fluid communication with said fluid cavity, said plurality of isolation valves isolating said fluid cavity from a temperature controlled fluid, said temperature controlled fluid flowing through said plurality of isolation valves and through said fluid cavity with said plurality of isolation valves open;

a pressure generator in fluid communication with said fluid cavity, said pressure generator configured to apply a fluid pressure to said fluid cavity when said pair of isolation valves are closed, said fluid pressure sufficient to prevent deformation of said die sheet beyond a specified limit; and a first pressure sensor measuring a mold pressure of said mold cavity, a second pressure sensor measuring a cavity pressure of said fluid cavity, and a controller monitoring said first and second pressure sensors, said controller configured to operate said pressure generator to maintain said cavity pressure substantially the same as said mold pressure when said mold pressure is greater than a specified pressure.

8. The apparatus of claim 7 further including at least one obstruction protruding into said fluid cavity, said at least one obstruction configured to disrupt a flow of a fluid flowing through said fluid cavity.

9. The apparatus of claim 7 further including a stanchion extending from said die support to said die sheet, said stanchion configured and dimensioned to support said die sheet against a pressure in said mold cavity.

10. The apparatus of claim 9 wherein said stanchion includes a through-opening connecting an opening in said die sheet with an opening in said die support, said stanchion including a seal between said fluid cavity and said through-opening.

11. The apparatus of claim 7 further including a melt pipe having a jacket in fluid communication with said fluid cavity, said melt pipe including a thin member defining a conduit, said thin member separating said conduit from said jacket, said jacket in fluid communication with a pressure generator to maintain a jacket pressure substantially equal to a conduit pressure to prevent deformation of said conduit beyond a specified limit.

12. An apparatus for molding, said apparatus comprising:
a die sheet separating a mold cavity from a fluid cavity, said die sheet having a low thermal mass such that said die sheet does not store a substantial amount of heat; and
a die support connecting said die sheet to a platen, said die sheet and said die support defining said fluid cavity, said fluid cavity configured to receive a fluid at a first temperature when said mold cavity receives a molding material and to receive said fluid at a second temperature to cure said molding material in said mold cavity, said fluid being a liquid;
a plurality of isolation valves in fluid communication with said fluid cavity, said plurality of isolation valves isolating said fluid cavity from a temperature controlled fluid, said temperature controlled fluid flowing through said plurality of isolation valves and through said fluid cavity with said plurality of isolation valves open;

a pressure generator in fluid communication with said fluid cavity, said pressure generator configured to apply a fluid pressure to said fluid cavity when said pair of isolation valves are closed, said fluid pressure sufficient to prevent deformation of said die sheet beyond a specified limit; and a controller operatively connected to said plurality of isolation valves, said controller executing a process including (a) circulating said liquid at a first temperature through said fluid cavity with said plurality of isolation valves open and before injecting a molding material into said mold cavity and with said liquid flowing through said plurality of isolation valves, (b) circulating said liquid at a second temperature through said fluid cavity with said plurality of isolation valves open and while injecting said molding material, (c) closing said plurality of isolation valves, (d) controlling said fluid cavity pressure to be substantially the same as a mold cavity pressure until said mold pressure falls below a specified value, and (e) opening said plurality of isolation valves and circulating said liquid at a third temperature through said fluid cavity to cool said molding material.

13. The apparatus of claim 12 wherein said die sheet has a thickness less than required to withstand a first pressure in said mold cavity without deformation and said fluid cavity is configured to receive and contain a fluid having a second pressure substantially equal to said first pressure.

14. The apparatus of claim 12 further including an insulator lining a portion of said fluid cavity to reduce heat transfer between said fluid in said fluid cavity and said die support and said platen.

15. The apparatus of claim 12 further including a melt pipe having a jacket in fluid communication with said fluid cavity, said melt pipe including a thin member defining a conduit, said thin member separating said conduit from said jacket, said jacket configured to sequentially receive said fluid at said first temperature and at said second temperature.

16. The apparatus of claim 12 further including at least one obstruction protruding into said fluid cavity, said at least one obstruction configured to disrupt a flow of said fluid moving through said fluid cavity.

17. The apparatus of claim 12 further including a stanchion extending from said die support to said die sheet, said stanchion configured and dimensioned to support said die sheet against a pressure in said mold cavity.

18. The apparatus of claim 12 further including an insulator between said die support and said platen.

* * * * *